US010447938B2

(12) United States Patent
Ekbladh et al.

(10) Patent No.: US 10,447,938 B2
(45) Date of Patent: Oct. 15, 2019

(54) CAMERA HOUSING ARRANGEMENT (71) Applicant: Axis AB, Lund (SE)

(72) Inventors: Mats-Åke Ekbladh, Lund (SE); Kristina Andersson, Lund (SE); Lars Andersson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/960,012

(22) Filed: Apr. 23, 2018

(65) Prior Publication Data
US 2018/0309934 A1 Oct. 25, 2018

(30) Foreign Application Priority Data

Apr. 24, 2017 (EP) .................................. 17167747

(51) Int. Cl.
*H04N 5/232* (2006.01)
*H04N 5/225* (2006.01)
*G08B 13/196* (2006.01)

(52) U.S. Cl.
CPC ... *H04N 5/23296* (2013.01); *G08B 13/19619* (2013.01); *G08B 13/19632* (2013.01); *H04N 5/2252* (2013.01)

(58) Field of Classification Search
CPC ............ H04N 5/23296; H04N 5/2252; G08B 13/19619; G08B 13/19632
See application file for complete search history.

(56) References Cited

U.S. PATENT DOCUMENTS

| 5,563,659 A * | 10/1996 | Bernhardt ............ H04N 5/2252 348/373 |
| 9,594,294 B2 | 3/2017 | Linden |
| 2008/0226282 A1* | 9/2008 | Takahashi .............. F16M 11/10 396/427 |

(Continued)

FOREIGN PATENT DOCUMENTS

| EP | 0 285 922 A2 | 10/1988 |
| JP | 2003-219121 A | 7/2003 |
| WO | 2013/121207 A1 | 8/2013 |

OTHER PUBLICATIONS

EP 17167747.9 European Search Report (dated Oct. 6, 2017).
Korean Office Action dated Jul. 5, 2019 for the Korean Patent Application No. 10-2018-0033700.

*Primary Examiner* — Jason A Flohre
(74) *Attorney, Agent, or Firm* — Volpe and Koenig, P.C.

(57) ABSTRACT

A camera housing arrangement comprising a camera housing member having a camera housing member extension plane, a camera housing mounting member defining a mounting plane, an abutment, and a pivot joint comprising: a hook portion associated with the camera housing member and a pivot axis portion associated with the camera housing mounting member. The camera housing member is movable by means of articulation about the pivot joint between a first end position in which the camera housing member extension plane is tilted with respect to said mounting plane, and a second end position in which the camera housing member extension plane is aligned with said mounting plane. The abutment is associated with the camera housing member and cooperates with the camera housing mounting member when the camera housing member is in said first end position such that the abutment engages the camera housing mounting member to preventing disconnection.

11 Claims, 10 Drawing Sheets

(56) References Cited

U.S. PATENT DOCUMENTS

| | | | |
|---|---|---|---|
| 2010/0067894 A1* | 3/2010 | Arbuckle | H04N 5/2252 |
| | | | 396/419 |
| 2010/0239241 A1 | 9/2010 | Chou | |
| 2014/0334058 A1* | 11/2014 | Galvan | F41H 13/0025 |
| | | | 361/232 |
| 2014/0334810 A1 | 11/2014 | Linden | |
| 2016/0086461 A1* | 3/2016 | Geng | H04N 5/2251 |
| | | | 348/143 |
| 2017/0168376 A1* | 6/2017 | Adervall | H04N 5/2252 |
| 2017/0205687 A1* | 7/2017 | Mitchell | G03B 17/561 |

* cited by examiner

CAMERA HOUSING ARRANGEMENT

FIELD OF INVENTION

The present invention relates to a camera housing arrangement.

BACKGROUND

Surveillance cameras are commonly used to monitor objects or people within an area of surveillance by producing streams of video images that may be displayed to and/or recorded for use by security personnel. To obtain a clear view of the area of surveillance, the surveillance cameras are often mounted many meters off the ground, to a wall, to a post structure or to a ceiling structure. This complicates the installation procedure for an installer of the surveillance camera and also makes the maintenance harder to perform.

To this end, the installation or maintenance personnel may need a scaffold or a ladder further complicating the handling of the surveillance camera.

Thus, there is a need for surveillance cameras that are simple to install. More specifically, there is a need to provide camera housing arrangements for surveillance cameras which may efficiently be installed and handled by installation and maintenance personnel.

SUMMARY

In view of the above, a camera housing arrangement allowing for efficient installation and/or handling is described herein. Further, preventing accidental disassembly of the camera housing arrangement which may damage the camera housing arrangement or a part thereof during installation or maintenance is desired.

According to a first aspect, a camera housing arrangement is provided, the camera housing arrangement comprising a camera housing member having a bottom side and extending in a camera housing member extension plane, a camera housing mounting member defining a mounting plane and arranged for supporting the camera housing member by engagement with the bottom side of the camera housing member, an abutment, and a pivot joint arranged at a distance from the abutment, the pivot joint comprising:

a hook portion associated with one of the camera housing member and the camera housing mounting member and a pivot axis portion associated with the other of the camera housing member and the camera housing mounting member, wherein the camera housing member is releasably connectable to the camera housing mounting member by movement of the camera housing member relative the camera housing mounting member in a hooking direction parallel with the camera housing member extension plane such that the hook portion engages the pivot axis portion, wherein the camera housing member, in a state connected to the camera housing mounting member, is movable by means of articulation about the pivot joint between a first end position in which the camera housing member extension plane is tilted with respect to said mounting plane, and a second end position in which the camera housing member extension plane is aligned with said mounting plane, and the abutment being associated with one of the camera housing member and the camera housing mounting member and arranged for cooperation with the other of the camera housing mounting member and the camera housing member when the camera housing member is in said first end position such that the abutment engages the camera housing mounting member or the camera housing member, and thereby prevents disconnection of the camera housing member from the camera housing mounting member, in response to movement of the camera housing member relative the camera housing mounting member in an un-hooking direction parallel to the camera housing member extension plane and opposite to said hooking direction.

An advantage is that a camera housing arrangement is provided which allows for improved handling during installation and/or maintenance.

The hook portion and the pivot axis portion provide a releasable connection between the camera housing member and the camera housing mounting member. The camera housing arrangement may thereby be assembled in a simpler manner.

Installation and maintenance personnel may also get access to the different parts of the camera housing member in a simple and safe manner.

In more detail, the installer may releasably connect the camera housing member by engaging the hook portion to the pivot axis portion by a movement of the camera housing member relative the camera housing mounting member in a hooking direction parallel with the camera housing member extension plane.

It may be noted that the hooking direction is defined in relation to the camera housing member extension plane and thus may vary in space depending on the orientation of the camera housing member extension plane in space.

The camera housing member may further be attached to the camera housing mounting member after the latter is mounted to a mount, for example, being attached to a wall or a post. The installation of the camera housing arrangement may thereby be performed in a sequence of steps reducing the load for the installer.

The articulation about the pivot joint further allows for a relative movement of the camera housing member and the camera housing mounting member when the camera housing arrangement is in the connected state. In other words, the camera housing member may be tilted in respect to the camera housing mounting member. Access to the bottom side of the camera housing member may, for example, be provided for the installer or maintenance personnel.

An advantage of the abutment cooperating with and engaging the camera housing mounting member or the camera housing member, is that the abutment prevents disconnection of the camera housing member from the camera housing mounting member when the camera housing member is in the first end position.

Accidental disconnection of the camera housing member and the camera housing mounting member during installation and/or maintenance is therefore prevented. In more detail, the camera housing arrangement allows the installation or maintenance personnel to rotate the camera housing member to the first end position at which the abutment may engage the camera housing mounting member or the camera housing member in response to relative motion therebetween. Any accidental disconnection due to movement of the camera housing member relative to the camera housing mounting member is in that way prevented in the first end position.

More specifically, the abutment cooperating with and engaging the camera housing mounting member or the camera housing member in response to movement of the camera housing member relative the camera housing mounting member in an un-hooking direction parallel to the camera housing member extension plane and opposite to said hooking direction prevents disconnection of the camera housing member from the camera housing mounting member.

An advantage is that forces exerted on the hooking portion and/or the pivot portion are reduced for movements along the un-hooking direction. Hence, a simpler and less robust design of the hooking portion and/or the pivot portion may be used, reducing the costs for manufacturing the camera housing arrangement. As a result the hooking portion may be chosen with larger flexibility.

The installation or maintenance personnel may, when the pivot joint is in the first position, let go of the camera housing member. At least one hand of the personnel is thereby freed, improving handling of the camera housing arrangement. Under the condition that the camera housing mounting member is fixed to a mount, both hands may be freed when the pivot joint is in the first position.

It should be noted that in this application the hooking and un-hooking direction are to be understood to be defined relative to the camera housing member extension plane and being parallel to the camera housing member extension plane. Thus, also the un-hooking direction may vary in space depending on the orientation of the camera housing member extension plane in space as will be discussed below.

The abutment may be arranged on the bottom side of the camera housing member.

The pivot joint may be arranged such that the articulation shifts between a first pivot axis of the pivot axis portion and a second pivot axis of the pivot axis portion during movement of the camera housing member between the first end position and the second end position.

The pivot axis portion may be associated with the camera housing mounting member, wherein the camera housing mounting member has a side edge provided with a shaft portion defining a second pivot axis of the pivot axis portion, wherein the camera housing mounting member has a top side provided with a recessed stepped configuration in a side portion of the top side associated with said side edge, the recessed stepped configuration comprises a top corner edge defining a first pivot axis of the pivot axis portion.

A more well controlled pivot motion may thereby be obtained. The shaft portion may be arranged to receive the hook portion, and play in-between the hook portion and shaft portion may be mitigated by means of the shift of articulation between the first axis portion and the second pivot axis. Constraints on the fabrication of the hook portion and/or the pivot axis portion are further reduced. A more cost effective fabrication of the camera housing arrangement may thus be achieved.

The camera housing arrangement may further comprise a cable interface arranged in the bottom side of the camera housing member and access to the cable interface may be provided when the camera housing member is in the first end position. Improved access to the cable interface is thereby provided for during installation and or maintenance of the camera housing arrangement.

The wording cable interface may be construed as a portion of the camera housing member through which a cable may be inserted or connected. The cable interface should therefore be interpreted broadly mechanical and or electrical access to the interior of the camera housing member may thereby be provided. Powering of and data transmission to/from electrical components arranged within the camera housing member, such as a video camera may thereby be realized.

The cable interface may, for example, be an opening with or without a grommet. The cable interface may alternatively comprise a cable connector such as an electrical connector or a fluid connector.

The cable interface may, in the second end position, be arranged within a space defined by the bottom side of the camera housing member and the camera housing mounting member.

An advantage is that the cable interface is protected within the defined space. The cable interface may thereby be protected from the environment surrounding the camera housing arrangement. Unauthorized tampering with cables may also be hampered. A less complex cable interface may further be used as it is protected within the space.

The camera housing member may comprise an overhang portion in the proximity of the pivot joint, wherein the centre of mass of the camera housing member is associated with said overhang portion.

As a result, gravity will cause, or at least reduce the force needed to move, the camera housing member, when connected to the camera housing mounting member, to pivot to the first end position. A simplified handling of the camera housing arrangement is thereby provided for installation or maintenance personnel. Gravity also drives the camera housing member to a position, i.e. the first position, where the abutment engages the camera housing mounting member or the camera housing member in response to the relative motion. A "self-locking" of the two members of the camera housing arrangement may thereby be obtained. Accidental disconnection of the camera housing member from the camera housing mounting member is further prevented.

The camera housing member may comprise an overhang portion in the proximity of the pivot joint and camera means arranged at least partly in said overhang portion, wherein the centre of mass of the camera housing member is associated with said overhang portion.

The weight of the camera means may thereby cause, or at least reduce the force needed to move, the camera housing member, when connected to the camera housing mounting member, to pivot to the first end position. The installation or maintenance personnel may thereby to rotate the camera housing member to the first end position at which the abutment engages the camera housing mounting member or the camera housing member in response to relative motion. Access to the bottom side of the camera housing member may be provided simplifying the connecting of the camera through for instance the cable interface discussed above.

The bottom side of the camera housing member may be arranged to engage with a side edge of the camera housing mounting member in said first end position, thereby defining the first end position.

A well-defined first end position is thereby achieved. The forces on the hook portion and/or the pivot axis portion may further be reduced. A simpler construction of the hook portion and/or the pivot axis portion may therefore be used when forming the camera housing arrangement.

The camera housing member may comprise an overhang portion in the proximity of the pivot joint and wherein the abutment is arranged in the overhang portion on the bottom side of the camera housing member at a distance from the pivot joint, the distance being sufficient for allowing the camera housing member to assume the first end position without the abutment engaging the camera housing mounting member.

The center of mass may be understood as a single point in space representing a distribution of mass in space, i.e. the mean location of a distribution of mass in space. The wording associated with said overhang portion should therefore be interpreted broadly. The centre of mass may geometrically be represented by a point inside or outside the material forming the overhang portion, i.e. the portion projecting away from the pivot joint, or by a point outside the material.

The abutment may be formed by a cooling fin.

The abutment formed by the cooling fin may be arranged on the camera housing member.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the teachings herein are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments are shown. This may, however, be embodied in many different forms and should not be construed as limited to the embodiments set forth herein; rather, these embodiments are provided for thoroughness and completeness, and to fully convey the scope to the skilled person.

Figure 1A:
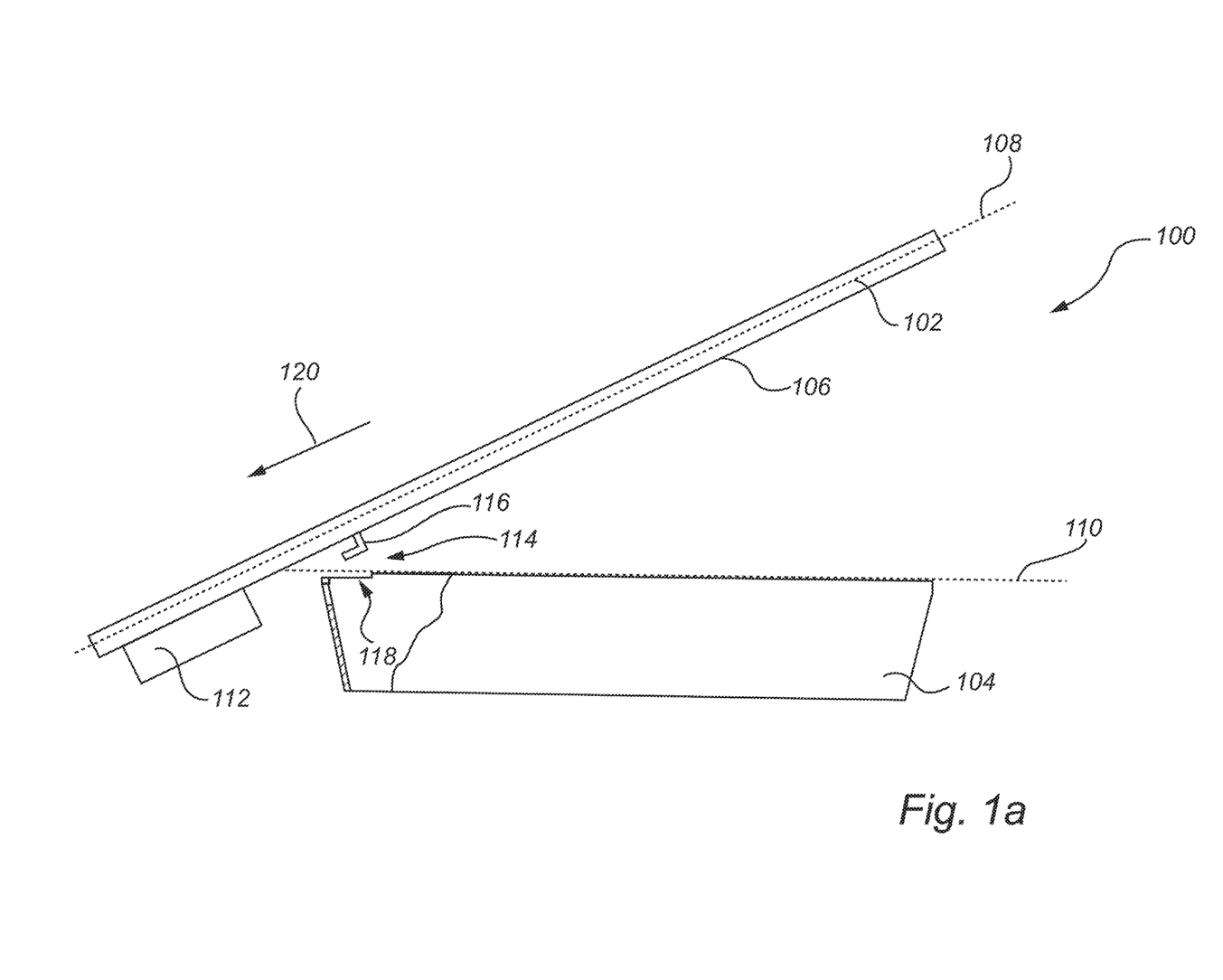
FIGS. 1a to 1c illustrate a camera housing arrangement.
Figure 1B:
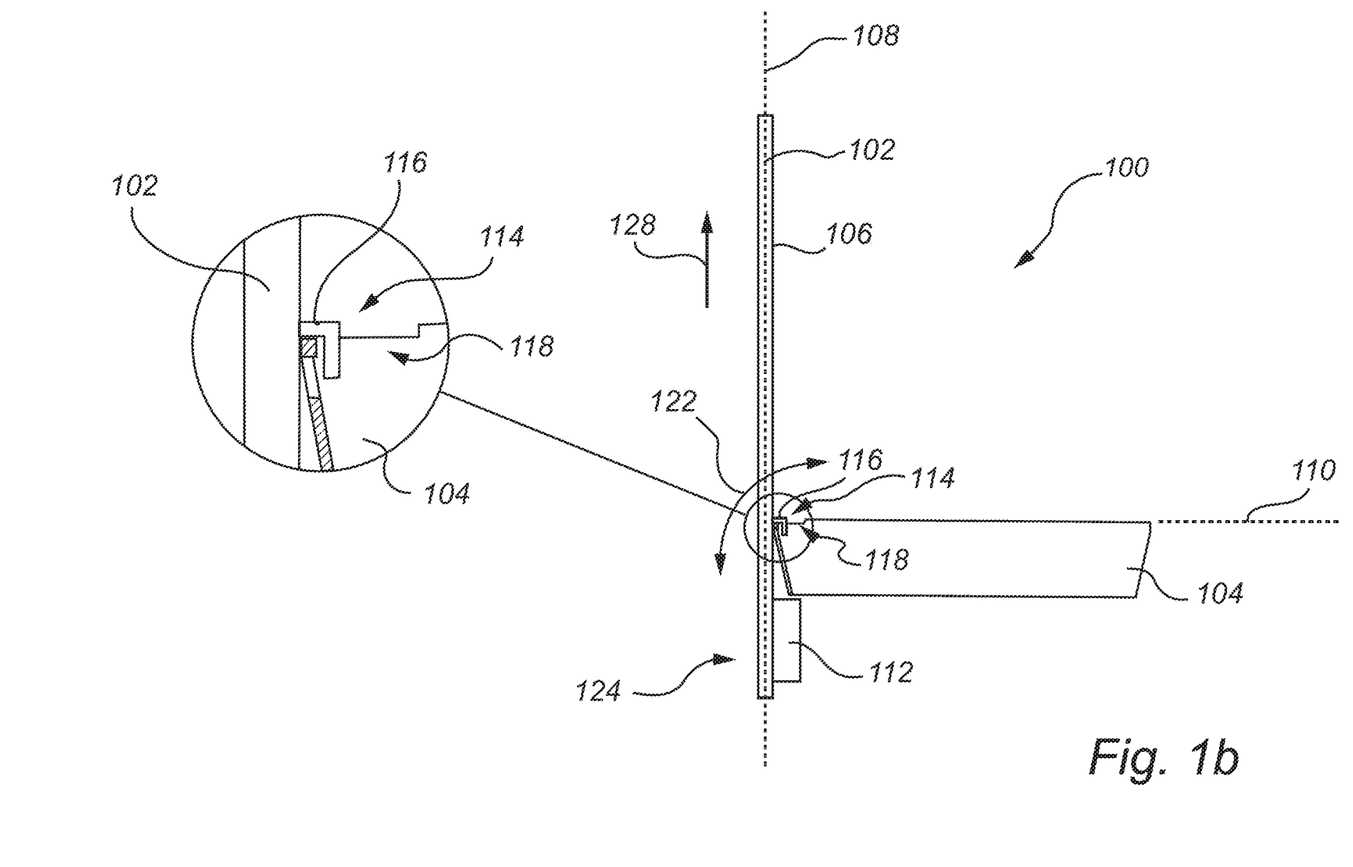
Figure 1C:
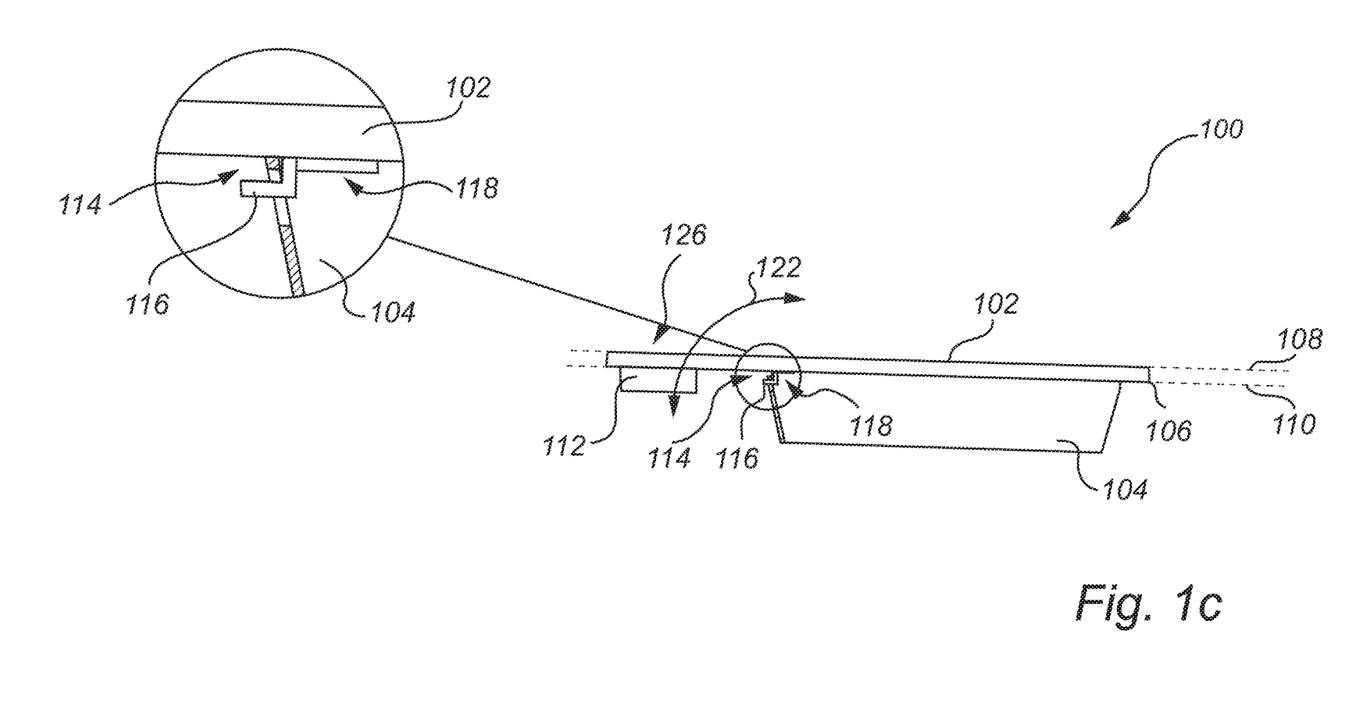

FIGS. 1a, 1b, and 1c illustrate a camera housing arrangement 100. The camera housing arrangement 100 comprises a camera housing member 102 and a camera housing mounting member 104. The camera housing member 102 has a bottom side 106 and is extending in a camera housing member extension plane 108. The camera housing mounting member 104 defines a mounting plane 110. The mounting plane 110 is arranged for supporting the camera housing member 102 by engagement with the bottom side 106 of the camera housing member 102.

The camera housing member 100 further comprises an abutment 112, and a pivot joint 114. The pivot joint 114 comprises a hook portion 116 associated with the camera housing member 102 and a pivot axis portion 118 associated with camera housing mounting member 104.

Referring to FIG. 1a, the camera housing member 102 is releasably connectable to the camera housing mounting member 104 by movement of the camera housing member 102 relative the camera housing mounting member 104 in a hooking direction 120 parallel with the camera housing member extension plane 108. The hook portion 116 may thereby engage the pivot axis portion 118, such that the camera housing member 102 is connected to the camera housing mounting member 104. The camera housing member 102 is, when connected to the camera housing mounting member 104, movable by means of articulation 122 about the pivot joint 114. More specifically, the movable articulation 122 is between a first end position 124, see FIG. 1b, in which the camera housing member extension plane 108 is tilted with respect to said mounting plane 110, and a second end position 126 in which the camera housing member extension plane 108 is aligned with said mounting plane 110, see FIG. 1c. In other words, the camera housing member 102 is movable relative to the camera housing mounting member 104 between a closed end position and an open end position, see FIGS. 1b and 1c, respectively.

The abutment 112 is in FIGS. 1a to 1c associated with the camera housing member 102. The abutment 112 is arranged for cooperation with the camera housing mounting member 104 when the camera housing member 102 is in the first end position 124. As a result, the abutment 112 engages the camera housing mounting member 104 in response to movement of the camera housing member 102 relative the camera housing mounting member 104 in an un-hooking direction 128 parallel to the camera housing member extension plane 108 and opposite to said hooking direction 120, see FIG. 1b.

An advantage of the abutment 112 cooperating with and, in response to movement, engaging with the camera housing mounting member 104 is that the abutment prevents disconnection of the camera housing member 102 from the camera housing mounting member 104 when the camera housing member 102 is in the first end position 124.

Accidental disconnection of the camera housing member 102 and the camera housing mounting member 104 during installation and/or maintenance is therefore prevented.

It may be noted that the hooking direction 120 and the un-hooking direction 128 are defined in relation to the camera housing member extension plane 108. The hooking direction 120 and the un-hooking direction 128 may therefore vary in directionality in space depending on how the camera housing member extension plane 108 is varied in space as a result of the movement of the camera housing member 102.

The abutment 112 illustrated in in FIGS. 1a to 1c is arranged on the bottom side 106 of the camera housing member 102. It may, however be noted that the abutment 112 may alternatively be associated with the camera housing mounting member 102 and arranged for cooperation with the camera housing member 102 when the camera housing member 102 is in the first end position such that the abutment engages 112 the camera housing member 102 in response to movement thereof.

As an example, the cooperation with the camera housing member 102 when the camera housing member 102 is in the first end position may be achieved by the abutment 112 forming a protrusion extending into a recess formed on the bottom side of the camera housing member 102. Thus, the abutment 102 may be arranged on a side surface or on the bottom side of the camera housing mounting member 104.

In the following, a camera housing arrangement 100 will be described for which the articulation 122 shifts in position during movement of the camera housing member 102 between the first end position 124 and the second end position 126. The shift of articulation 122 allows for a more well defined pivot motion. In more detail, the camera housing arrangement 100 comprises a pivot joint 114 which is arranged such that the articulation 122 shifts between a first pivot axis 118a of the pivot axis portion 118 and a second pivot axis 118b of the pivot axis portion 118 during movement 122 of the camera housing member 102 between the first end position 124 and the second end position 126. FIGS. 2a to 2e illustrate the shift of the articulation 122 in a sequence. In the shown embodiment, the articulation 122 shifts between the first pivot axis 118a to the second pivot axis 118b during movement of the camera housing member 102 from the second end position 126 to the first end position 124.

Figure 2A:
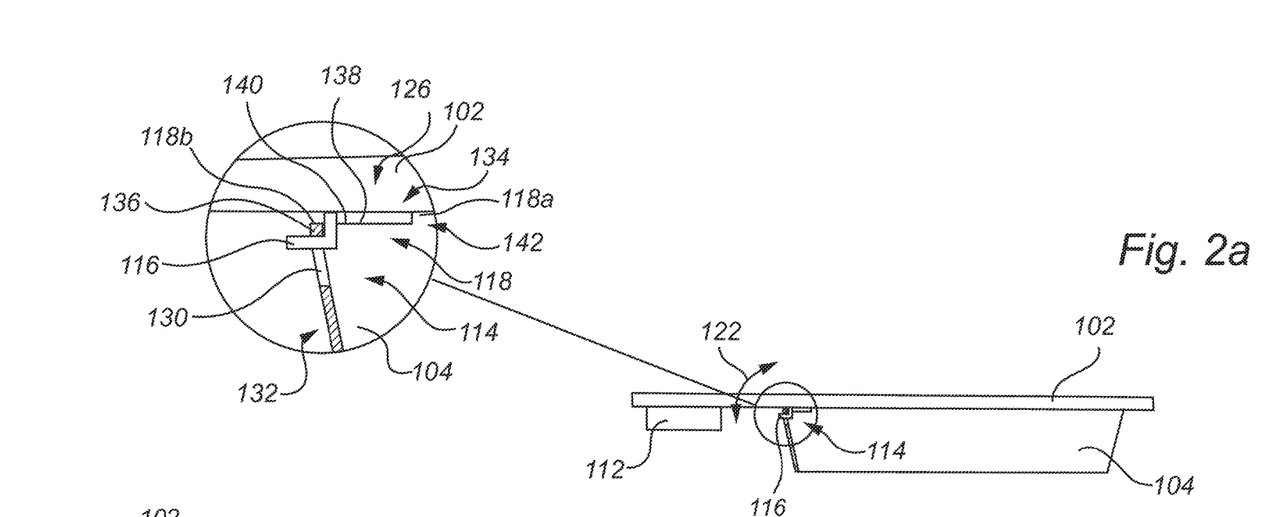
FIGS. 2a to 2e illustrate a camera housing arrangement.

In a first state of the sequence, see FIG. 2a, the camera housing member 102 is illustrated, in the second end position 126. The camera housing member 102 is releasably connected to the camera housing mounting member 104 by the hook portion 116 engaging the pivot axis portion 118, illustrated by the hook portion 116 extending through an opening 130 in the camera housing mounting member 104. FIG. 2a further illustrates that the camera housing mounting member 104 has a side edge 132 and a top side 134. The side edge 132 is provided with a shaft portion 136 defining the second pivot axis 118b of the pivot axis portion 118. The top side 134 is provided with a recessed stepped configuration 138 in a side portion 140 of the top side 134 associated with the side edge 132. The recessed stepped configuration 138 comprises a top corner edge 142 defining the first pivot axis 118a of the pivot axis portion 118.

Figure 2B:
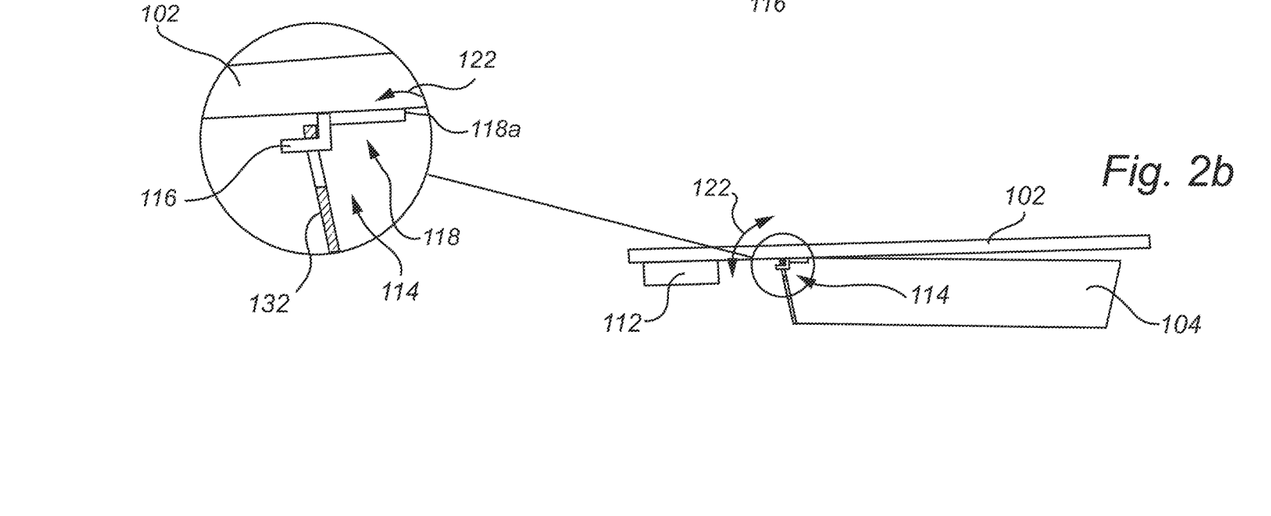
Figure 2C:
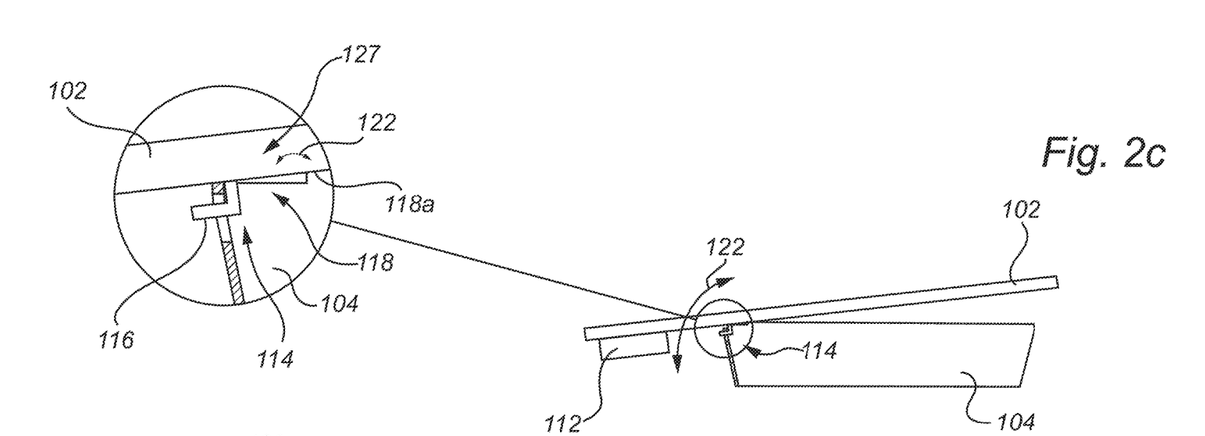
Figure 2D:
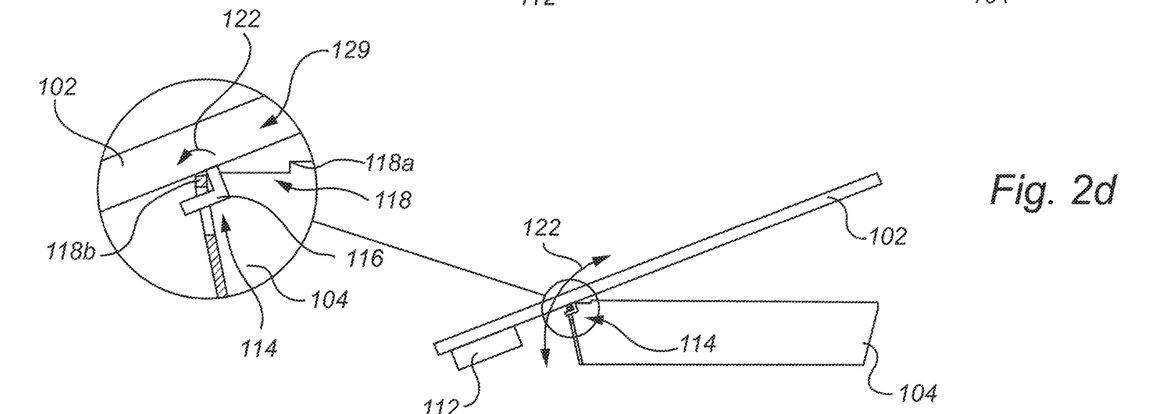

FIGS. 2b to 2d illustrate later stages of the sequence, showing how the pivot joint 114 allows for a shift in the articulation 122 between a first pivot axis 118a of the pivot axis portion 118 and a second pivot axis 118b of the pivot axis portion 118 during movement of the camera housing member 102 between the first end position 124 and the second end position 126. Play in-between the hook portion 116 and the shaft portion 136 may thereby be mitigated.

In more detail, FIG. 2b illustrates that the articulation 122 initially occurs around the first pivot axis 118a when the camera housing member 102 is rotated from the second end position 126 towards the first end position 124. FIGS. 2c and 2d further illustrate when the camera housing member 102 is arranged, relative to the camera housing member 104, in two intermediate positions 127 and 129, between which the articulation 122 shifts from the first pivot axis 118a to the second pivot axis 118b, c.f. FIGS. 2c and 2d.

In other words, in the intermediate state 127 a rotation around the first pivot axis 118a is achieved whereas in the intermediate state 129 a rotation around the second pivot axis 118b is achieved.

Figure 2E:
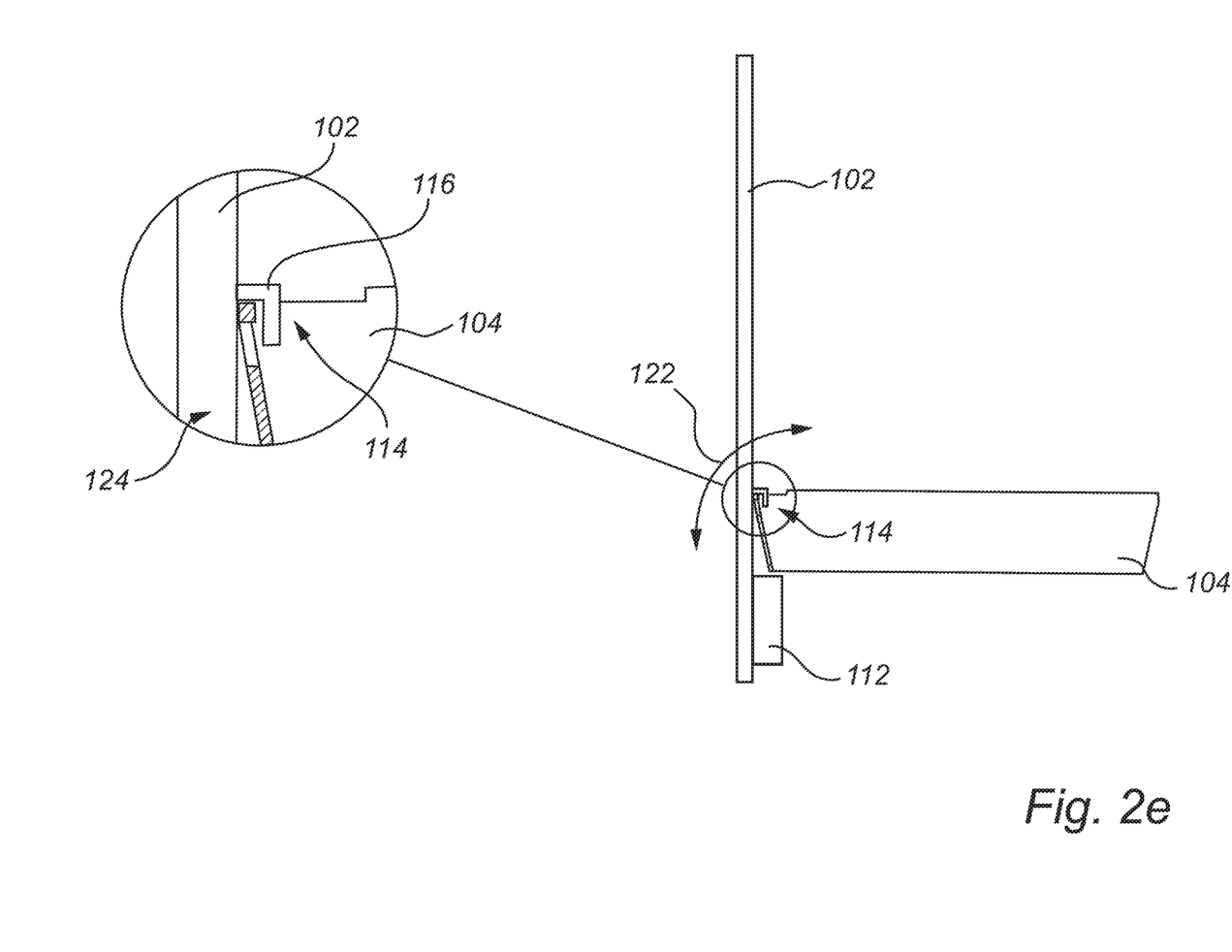

Finally, FIG. 2e illustrates the camera housing member 102 when it is completely rotated 122 to the first end position 124.

Figure 3:
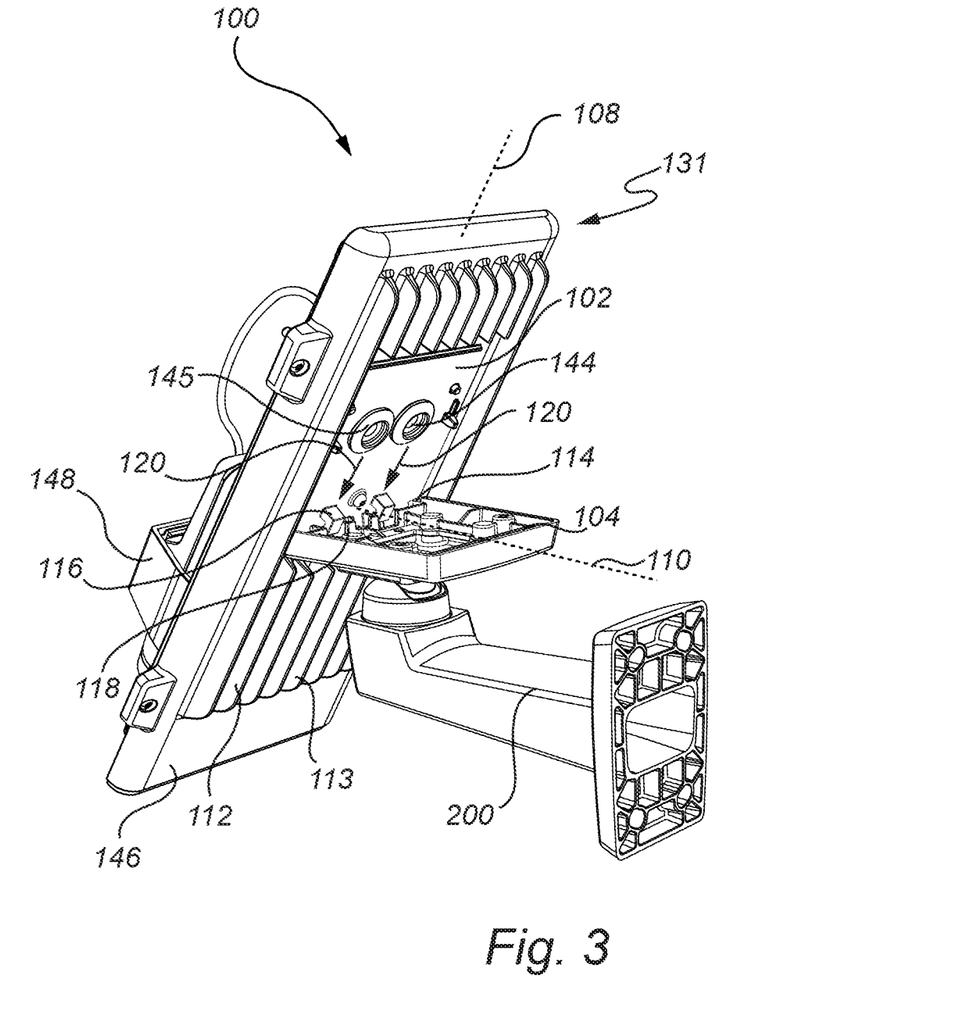
FIG. 3 illustrates a perspective view of a camera housing arrangement.
Figure 4:
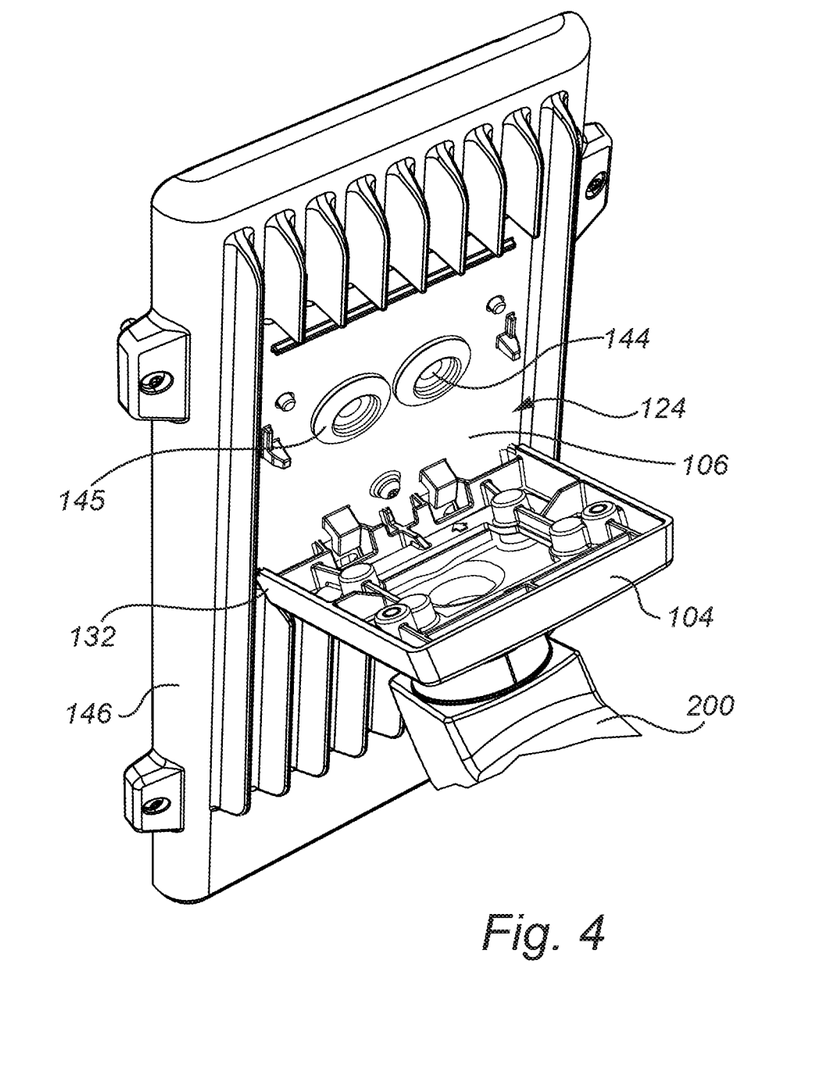
FIG. 4 illustrates a perspective view of a camera housing arrangement.
Figure 5:
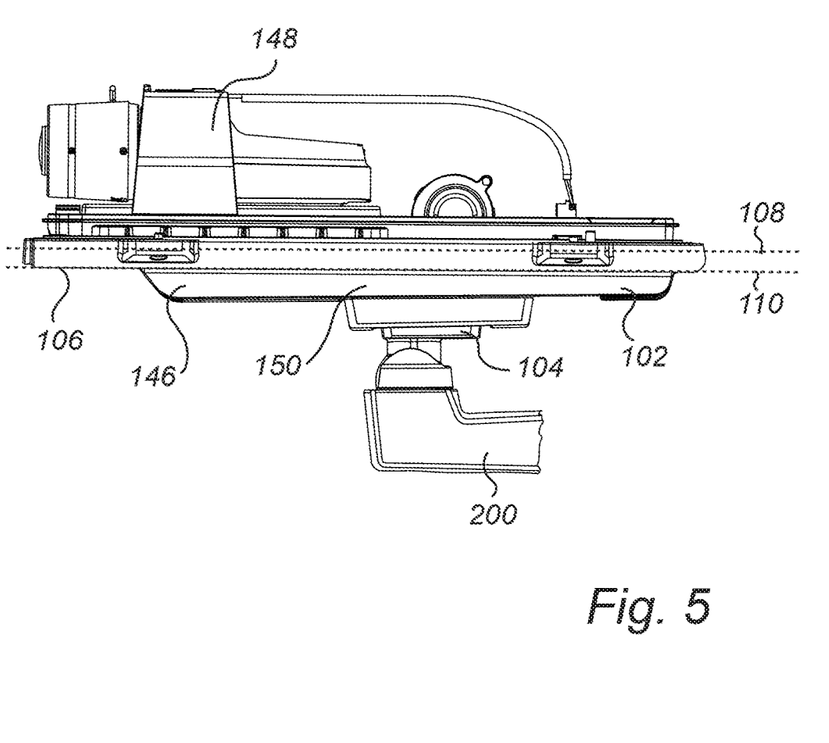
FIG. 5 illustrates a side view of camera a housing arrangement.

FIGS. 3 to 5 illustrate schematically a camera housing arrangement 100 in different perspective views. FIG. 3 illustrates the camera housing arrangement 100 in an intermediate state 131 of the movement from the second end position 126 to the first end position 124. The camera housing arrangement 100 of FIG. 3 comprises a camera housing member 102 and a camera housing mounting member 104, as described above. The camera housing mounting member 104 is attached to a mount 200. FIGS. 4 and 5 illustrate the same camera housing arrangement 100 in the first end position 124 and the second end position 126, respectively.

As also discussed above, the camera housing member 102 has been releasably connected to the camera housing mounting member 104 by a relative movement of the camera housing member 102 and the camera housing mounting member 104, i.e. a movement in a hooking direction 120 parallel with the camera housing member extension plane 108 by which the hook portion 116 engages the pivot axis portion 118.

FIGS. 3 and 4 further illustrate that the camera housing arrangement 100 may comprise a cable interface 144 arranged in the bottom side 106 of the camera housing member 102. Access to the cable interface 144 is thereby provided when the camera housing member 102 is in the intermediate state 131. As a non-limiting example the cable interface 144 comprises an opening. A grommet 145 is further arranged in the opening.

Access to the cable interface 144 may also be provided when the camera housing member 102 is in the first end position 124, see FIG. 4. Improved access to the cable interface 144 is thereby provided for during installation and or maintenance of the camera housing arrangement 100.

The camera housing member 102 may comprise an overhang portion 146, see FIG. 3 or 4, in the proximity of the pivot joint, wherein the centre of mass of the camera housing member 102 is associated with the overhang portion 146. As a result, gravity will cause, the camera housing member 102 to pivot towards or to the first end position 124, or at least reduce the force needed for pivoting. A simplified handling of the camera housing arrangement 100 is thereby provided for installation or maintenance personnel.

The camera housing member 104 may further comprise camera means 148 arranged at least partly in the overhang portion 146, see FIGS. 3 and 4. The centre of mass of the camera housing member 102 is thereby associated with the overhang portion 146. The weight of the camera means 148 may thereby cause, or at least reduce the force needed to move, the camera housing member 102, when connected to the camera housing mounting member 104, to pivot to the first end position 124.

FIG. 4 further illustrates that the bottom side 106 of the camera housing member 102 may be arranged to engage with a side edge 132 of the camera housing mounting member 104 in the first end position 124, thereby defining the first end position 124. For clarity, such an engagement is also illustrated in FIGS. 1b or 2e. The forces on the hook portion 116 and/or the pivot axis portion 118 may thereby be reduced.

FIGS. 3 and 4 further illustrate that the abutment 112 may be arranged in the overhang portion 146 on the bottom side 106 of the camera housing member 102 at a distance from the pivot joint 114, the distance being sufficient for allowing the camera housing member 102 to assume the first end position 124 without the abutment 112 engaging the camera housing mounting member 104. This is advantageous as the gravity drives the camera housing member 102 to a position, i.e. the first position 124, where the abutment engages the camera housing mounting member 104 response to the relative motion. A "self-locking" of the two members 102, 104 of the camera housing arrangement 100 may thereby be obtained.

The camera housing member 100 illustrated in FIGS. 3 and 4 further comprise abutments 112 in the form of cooling fins 113.

FIG. 5 illustrates the same camera housing arrangement 100 as in FIGS. 3 and 4, but being set in the second end position 126. In FIG. 5, the cable interface 124 may in the second end position 126 be arranged within a space 150 defined by the bottom side 106 of the camera housing member 102 and the camera housing mounting member 104. An advantage is that the cable interface 124 is protected within the defined space 150.

Figure 6:
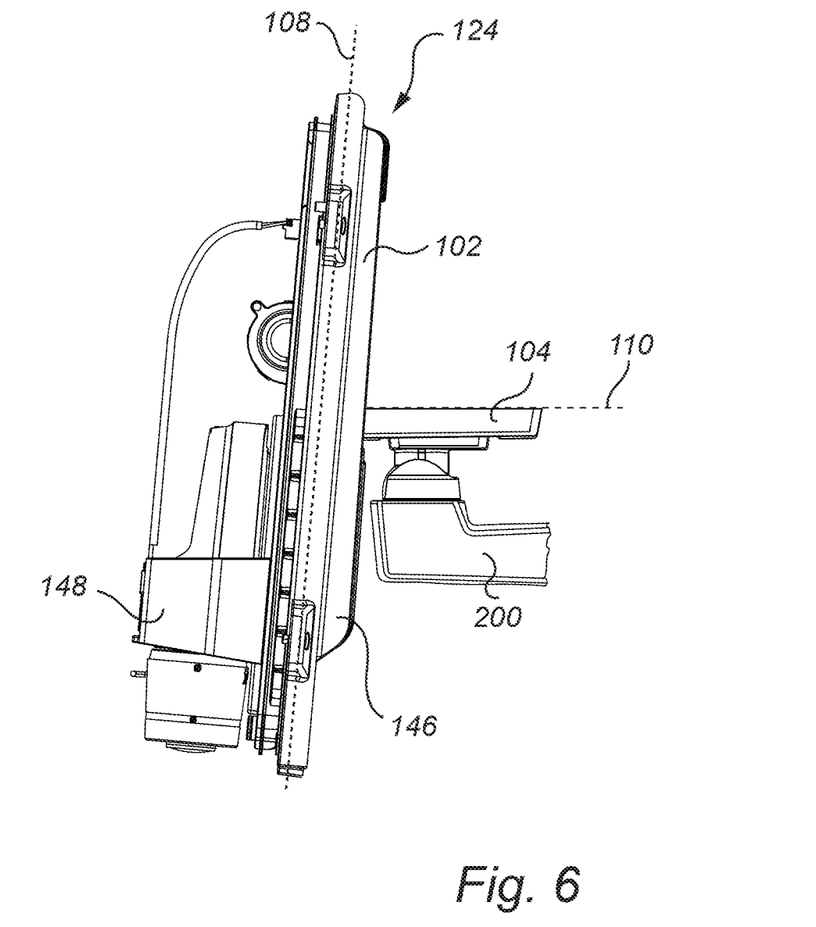
FIG. 6 illustrates a side view of a camera housing arrangement.

For completeness, FIG. 6 illustrates the same camera housing arrangement 100 as in FIGS. 3 to 5, but when the camera housing member is in the first end position 124, i.e. in a different view from that illustrated in FIG. 4.

The person skilled in the art realizes that the present teachings by no means are limited to the embodiments described above. On the contrary, many modifications and variations are possible within the scope of the appended claims.

For example, as an alternative to the description above, the pivot joint may comprise a hook portion associated with the camera housing mounting member 104 and a pivot axis portion associated with camera housing member 102.

Similarly, the abutment 112 may alternatively be associated with the camera housing mounting member 104 and arranged for cooperation with the camera housing member 102 when the camera housing member 102 is in said first end position 124 such that the abutment 112 engages the camera housing mounting member 104.

Additionally, variations to the disclosed embodiments can be understood and effected by the skilled person in practicing the claimed invention, from a study of the drawings, the disclosure, and the appended claims.

What is claimed is:

1. A camera housing arrangement, comprising a camera housing member having a bottom side and extending in a camera housing member extension plane,
   a camera housing mounting member defining a mounting plane and arranged for supporting the camera housing member by engagement with the bottom side of the camera housing member,
   an abutment, and
   a pivot joint arranged at a distance from the abutment, the pivot joint comprising:
   a hook portion associated with one of the camera housing member and the camera housing mounting member and
   a pivot axis portion associated with the other of the camera housing member and the camera housing mounting member,
   wherein the camera housing member is releasably connectable to the camera housing mounting member by movement of the camera housing member relative the camera housing mounting member in a hooking direction parallel with the camera housing member extension plane such that the hook portion engages the pivot axis portion,
   wherein the camera housing member, in a state connected to the camera housing mounting member, is movable by means of articulation about the pivot joint between
   a first end position in which the camera housing member extension plane is tilted with respect to said mounting plane, and
   a second end position in which the camera housing member extension plane is aligned with said mounting plane, and
   the abutment being associated with one of the camera housing member and the camera housing mounting member and arranged for cooperation with the other of the camera housing mounting member and the camera housing member when the camera housing member is in said first end position such that the abutment engages the camera housing mounting member or the camera housing member, and thereby prevents disconnection of the camera housing member from the camera housing mounting member, in response to movement of the camera housing member relative the camera housing mounting member in an un-hooking direction parallel to the camera housing member extension plane and opposite to said hooking direction.

2. The camera housing member according to claim 1, wherein the abutment is arranged on the bottom side of the camera housing member.

3. The camera housing arrangement according to claim 1, wherein the pivot joint is arranged such that the articulation shifts between a first pivot axis of the pivot axis portion and a second pivot axis of the pivot axis portion during movement of the camera housing member between the first end position and the second end position.

4. The camera housing arrangement according to claim 3, wherein the pivot axis portion is associated with the camera housing mounting member,
   wherein the camera housing mounting member has a side edge provided with a shaft portion defining a second pivot axis of the pivot axis portion,
   wherein the camera housing mounting member has a top side provided with a recessed stepped configuration in a side portion of the top side associated with said side edge,
   the recessed stepped configuration comprises a top corner edge defining a first pivot axis of the pivot axis portion.

5. The camera housing arrangement according to claim 1, further comprising a cable interface arranged in the bottom side of the camera housing member and wherein access to the cable interface is provided when the camera housing member is in the first end position.

6. The camera housing arrangement according to claim 5, wherein the cable interface in the second end position is arranged within a space defined by the bottom side of the camera housing member and the camera housing mounting member.

7. The camera housing arrangement according to claim 1, wherein the camera housing member comprises an overhang portion in the proximity of the pivot joint, wherein the centre of mass of the camera housing member is associated with said overhang portion.

8. The camera housing arrangement according to claim 1, wherein the camera housing member comprises an overhang portion in the proximity of the pivot joint and camera means arranged at least partly in said overhang portion, wherein the centre of mass of the camera housing member is associated with said overhang portion.

9. The camera housing arrangement according to claim 1, wherein the bottom side of the camera housing member is arranged to engage with a side edge of the camera housing mounting member in said first end position, thereby defining the first end position.

10. The camera housing arrangement according to claim 1, wherein the camera housing member comprises an overhang portion in the proximity of the pivot joint and wherein the abutment is arranged in the overhang portion on the bottom side of the camera housing member at a distance from the pivot joint, the distance being sufficient for allowing the camera housing member to assume the first end position without the abutment engaging the camera housing mounting member.

11. The camera housing arrangement according to claim 1, wherein the abutment is formed by a cooling fin.

* * * * *